(12) United States Patent
Baker

(10) Patent No.: US 6,453,603 B1
(45) Date of Patent: Sep. 24, 2002

(54) TAMPER RESISTANT NON-CORROSIVE BORE HOLE COVER ASSEMBLY

(76) Inventor: Jerry G. Baker, 202 Greenwood St., Houma, LA (US) 70364

( * ) Notice: Subject to any disclaimer, the term of this patent is extended or adjusted under 35 U.S.C. 154(b) by 0 days.

(21) Appl. No.: 09/650,444

(22) Filed: Aug. 29, 2000

Related U.S. Application Data

(60) Provisional application No. 60/179,251, filed on Jan. 31, 2000, provisional application No. 60/152,228, filed on Sep. 3, 1999, and provisional application No. 60/155,890, filed on Sep. 27, 1999.

(51) Int. Cl.[7] .................................................. A01M 1/20
(52) U.S. Cl. ............................ 43/124; 43/131; 43/132.1
(58) Field of Search ............................... 43/124, 132.1, 43/131

(56) References Cited

U.S. PATENT DOCUMENTS

| | | | | |
|---|---|---|---|---|
| 2,155,491 A | * | 4/1939 | Jacobs ........................ | 138/89 |
| 2,245,887 A | * | 6/1941 | Wikander ................... | 138/89 |
| 3,667,640 A | * | 6/1972 | Morrow ...................... | 220/235 |
| 3,910,191 A | * | 10/1975 | Williams ..................... | 138/89 |
| 5,329,726 A | * | 7/1994 | Thorne et al. ............... | 43/124 |
| 5,873,193 A | * | 2/1999 | Jensen ........................ | 43/131 |
| 5,901,496 A | * | 5/1999 | Woodruff .................... | 43/124 |
| 5,918,410 A | * | 7/1999 | Knuppel ..................... | 43/131 |
| 5,927,000 A | * | 7/1999 | Bordes, Jr. ................. | 43/132.1 |
| 6,079,150 A | * | 6/2000 | Setikas et al. ............. | 43/132.1 |
| 6,192,621 B1 | * | 2/2001 | Fain ........................... | 43/131 |
| 6,357,170 B1 | * | 3/2002 | Bordes, Jr. ................. | 43/124 |

* cited by examiner

Primary Examiner—Kurt Rowan
(74) Attorney, Agent, or Firm—Adams and Reese LLP

(57) ABSTRACT

A non-corrosive bore hole cover apparatus for plugging a hole bored in a substrate is provided comprising a top plate molded from a non-metallic material, a bottom plate molded from a non-metallic material, a compressible ring gasket sandwiched between the top and bottom plates, and a threaded bolt. A bottom side of the top plate and a top side of the bottom plate each have an annular gasket locating ridge formed thereon. The compressible ring gasket is sandwiched between the top plate and the bottom plate such that the gasket locating ridges are inserted in either end of the compressible ring gasket. The threaded bolt passes through a top plate hole such that a head of the bolt is retained against a top side of the top plate and a tail end of the bolt is threaded through a hole of the bottom plate. The bolt is rotated into the threaded hole to draw the top and bottom plates together to compress and circumferentially expand the gasket. The threads of the bottom plate are preferably provided by a winged t-nut insert. Reinforcement rib members are preferably provided on the top and bottom plates. The top plate preferably has a convex configuration. The gasket preferably has a plurality of longitudinal reinforcement ribs. The top side of the bottom plate preferably has a tapered bolt locating ridge formed about the bottom plate hole. The color of the top plate preferably matches the color of the surface of the substrate.

25 Claims, 6 Drawing Sheets

TAMPER RESISTANT NON-CORROSIVE BORE HOLE COVER ASSEMBLY

CROSS REFERENCE TO RELATED APPLICATIONS

Applicant herein claims priority and continuance of Provisional Patent Application Serial No. 60/152,228 filed Sep. 3, 1999 by Jerry G. Baker, Provisional Patent Application Serial No. 60/155,890 filed Sept. 27, 1999 by Jerry G. Baker, and Provisional Patent Application Serial No. 60/179,251 filed Jan. 31, 2000 by Jerry G. Baker, all of which are pending.

FIELD OF THE INVENTION

The field of art of the invention is bored hole plug devices.

BACKGROUND OF THE INVENTION

Substrates such as walls of buildings, sidewalks, parking lots, patios, pool decks, and other structures ordinarily prevent access for inspection of the condition of termite baiting materials, plumbing and waterlines, wiring, mechanical devices such as pumps, and is other components below the surface of the substrates. Such subsurface components can be accessed by boring a hole into the substrate. The bore hole can be sealed with a removable cover to allow reaccess to the bore hole and the components therein.

The present invention relates to improvements over removable bore hole plug deices, including particularly the tamper resistant bait cover and bait access system disclosed in U.S. Pat. 5,927,000 (Edgar S. Bordes). Bordes shows a design of a bore hole cover assembly that can be placed in a hole that is bored through the substrate. The bore hole cover assembly described by Bordes prior art is composed of a top plate, a bottom plate, and a rubber gasket affixed together using a bolt and nut welded to the bottom plate. In actual practice, Bordes design is manufactured using a metal top plate, a metal bottom plate, a metal bolt, a metal nut welded to the bottom plate, and a rubber gasket. The metal top and bottom plates are modified aluminum plumbers plugs. These bottom plate nut assemblies have significantly corroded when hole covers made according to Bordes prior art and manufacturing design have been installed in humid and wet locations. This corrosion causes the nut assembly to fail and therewith the entire Bordes hole cover assembly to fail. Because the nut is welded to the bottom plate, the entire bottom plate must be replaced when this failure occurs. Corrosion is a particular problem in this field of art because termites and other such destructive insects significantly inhabit geographic areas of high humidity and wetness. Top plates and bottom plates of the Bordes design can not be made of inexpensive non-corrosive plastic materials.

Other deficiencies of the prior art of Bordes and Bordes manufacturing design are the failure of Bordes to: a) specify a means of seating the compression gasket in place to achieve firm and uniform compression against the sides of the hole bored in the substrates; b) provide for an at-rest curved top to compensate for the downward deflection of the top, the lack of which causes water to collect on the top and internally, accelerating corrosion; and (c) to provide for resiliency in Bordes top plate to address the possible permanent deformation of the top plate when the top plate is struck or depressed with a hammer, heavy equipment, etc., said deformation causing Bordes apparatus to become less tamper resistant or more difficult to remove for inspection purposes.

Additionally, hole cover top plates manufactured in accordance with Bordes prior art and manufacturing design and of the designs of others are not colored to closely match the surface of the substrate into which they are installed. Therefore, the current hole covers are visually apparent and attract vandals. In part as a result of the higher visibility, a number of hole covers have been damaged, removed, or stolen, exposing the bait materials in termite bait traps and giving unwanted access to children and the general public to termite treatment chemicals and other subsurface components.

Several models of bore hole covers for insecttreatment and/or inspection have been made in addition to that shown in Bordes prior art and manufacturing design. See U.S. Pat. No. 2,155,491 (Jacobs); U.S. Pat. No. 2,245,887 (Wikander); U.S. Pat. No. 3,667,640 (Morrow); U.S. Pat. No. 3,910,191 (Williams). To the best of the inventor's knowledge, all of these models and that shown in Bordes prior art and manufacturing design are composed of multiple piece bodies that utilize a combination metal with welded parts and/or a rubber compression ring gasket or do not employ all or the combination of the design particulars of the inventor.

The inventor has designed an improved bore hole cover apparatus that solves the foregoing deficiencies and problems of the prior art, and that can be economically manufactured using conventional molding techniques.

OBJECTS AND SUMMARY OF THE INVENTION

It is an object of the invention to provide a non-corrosive bore hole cover assembly.

It is another object of the invention to provide a non-corrosive bore hole cover assembly in which the top plate, bottom plate, and ring gasket are designed to be manufactured of inexpensive plastics.

It is another object of the invention to provide a non-corrosive bore hole cover assembly in which the top plate is manufactured from a material that can be color matched to the bored substrate.

It is another object of the invention to provide a non-corrosive bore hole cover assembly in which the bottom plate has a replaceable threaded insert which can be replaced should failure occur.

It is another object of the invention to provide a non-corrosive bore hole cover assembly in which the top plate and the bottom plate have circular locating rings that maintain the alignment of the compression ring gasket.

It is yet another object of the invention to provide a non-corrosive bore hole cover assembly in which the bottom plate has an internal bolt locating ring to assist in the assembler in starting the connecting bolt.

These and other objects and advantages of the invention shall become apparent from the following general and preferred description of the invention.

A non-corrosive bore hole cover apparatus for plugging a hole bored in a substrate is provided comprising, generally, a top plate molded from a non-metallic material, a bottom plate molded from a non-metallic material, a compressible ring gasket sandwiched between the top and bottom plates, and a bolt passing through the top plate, gasket, and bottom plate, the bolt being positioned and configured to selectively draw the top and bottom plates together to compress the ring gasket. The top plate has a hole therethrough, and a bottom side of the top plate has an annular gasket locating ridge formed thereon. The bottom plate has a threaded hole therein, and a top side of the bottom plate has an annular gasket locating ridge formed thereon. The gasket locating ridges are of substantially equal outer diameter. The compressible ring gasket has an elongated wall and an inner diameter sized to tightly encircle the outer diameter of the gasket locating ridges. The compressible ring gasket is sandwiched between the top plate and the bottom plate such that the gasket locating ridges are inserted in either end of the compressible ring gasket. The threaded bolt passes through the top plate hole such that a head of the bolt is retained against a top side of the top plate and a lower or tail end of the bolt is threaded through the hole of the bottom plate. The bolt may be selectively rotated into the threaded hole to draw the top and bottom plate toward one another to thereby compress and circumferentially expand the ring gasket. The gasket locating ridges maintain alignment of the compressible ring gasket and the top and bottom plates during compression to thereby achieve substantially uniform compression against the bore hole.

The top and bottom plates are preferably molded from a glass reinforced polymer. The top side of the top plate preferably has a convex configuration so as to compensate for downward deflection of the top plate during compression of the compressible gasket ring and to reduce pooling of water on the top plate. The bottom side of the top plate preferably has a plurality of reinforcement ribs formed thereon, the reinforcement ribs radiating outward about the top plate hole, the rib members providing reinforcement for the top plate. A top surface of the top plate is preferably recessed about the top plate hole such that a head of the bolt is substantially flush with the top surface of the top plate to thereby reduce water pooling on the top plate. The top side of the bottom plate preferably has a tapered bolt locating ridge formed about the threaded hole.

The compressible ring gasket preferably has a plurality of ribs formed on an inner side of the elongated wall, the gasket ribs being positioned longitudinally about the inner side of the elongated wall to thereby reinforce the ring gasket during compression. The gasket ribs permit the compressible ring gasket to be of thin-walled construction and of reduced weight. The compressible ring gasket is molded from a non-rubber thermal plastic elastomer.

The bottom plate preferably has a plurality of rib members formed thereon, the bottom plate rib members radiating outward about the threaded hole, the bottom plate rib members providing reinforcement for the bottom plate. The rib members are preferably positioned on a bottom side of the bottom plate.

The threads of the bottom plate hole may be molded into the bottom plate. In a preferred embodiment, the threads of the bottom plate hole are provided by a non-corrosive threaded winged t-nut disposed in the hole, the wings of the t-nut configured and positioned to engage the bottom plate rib members so as to assist in maintaining the t-nut in fixed non-rotational relation to the bottom plate. A retaining means, such as a locking nut, may be secured to a tail end of the threaded bolt for preventing the bottom plate from separating from the apparatus during removal of the apparatus from the bore hole.

The top plate is preferably of a color selected to substantially match a color of a surface of the substrate. The bottom plate and gasket may also be selected to match the color of the surface of the substrate. The components of the apparatus are preferably constructed from materials that can be re-ground and recycled to manufacture duplicate replacement parts.

The apparatus is used by inserting the bore hole cover in the opening of the bore hole such that the top plate rests against a surface of the substrate, and then rotating the bolt to thereby circumferentially compress the compressible ring gasket against the bore hole and thereby seal the bore hole. A termite bait material may be inserted in the bore hole prior to closing the bore hole with the bore hole cover. The color of the bore hole cover may be selected such that the color of the bore hole cover substantially matches a color of the surface of the substrate. When the threads of the threaded hole have become worn or unuseable through overuse or over torquing, the threads can be replaced by removing the bore hole cover from the bore hole, removing the bottom plate from the apparatus, removing the t-nut from the bottom plate hole, and inserting a new t-nut in the bottom plate hole.

DESCRIPTION OF THE PREFERRED EMBODIMENTS

Figure 3:
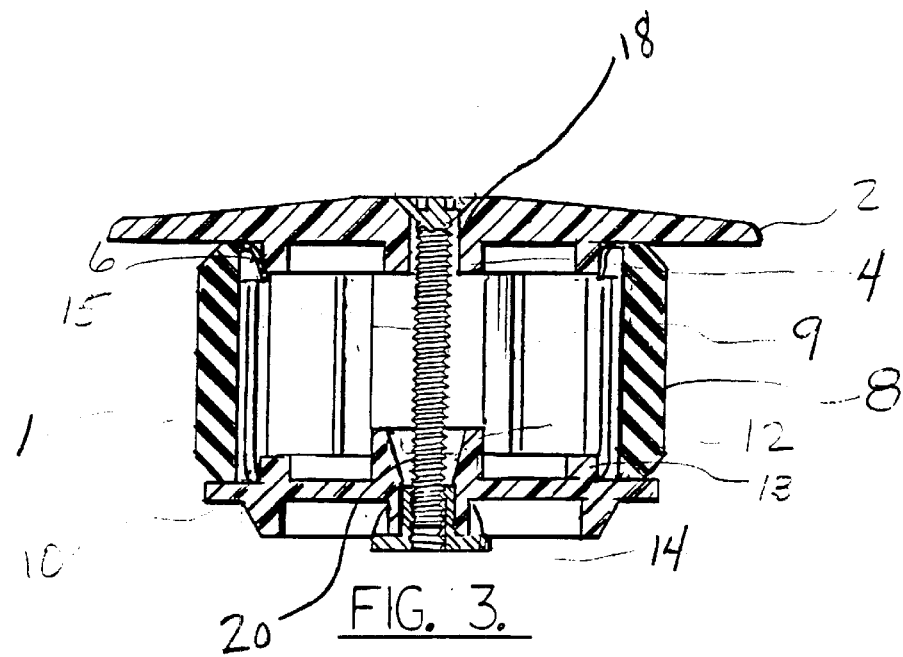
FIG. 3 shows a section view of the main body assembly of the tamper resistant non-corrosive bore hole assembly, taken along 3—3 of FIG. 1.

As shown in FIG. 3, the non-corrosive bore hole cover apparatus of the invention 1 comprises, generally, a top plate 2, a bottom plate 10, a ring gasket 8 sandwiched between the top 2 and bottom 10 plates, and a security bolt 15, the bolt 15 being situated for use in drawing the top 2 and bottom 10 plates toward one another to thereby compress the ring gasket 8. While the foregoing general structure is known in the art, the modifications described below significantly improve the prior art by providing a bore hole cover assembly that eliminates the problems discussed above that are impeding the commercial success and usefulness of the prior art bore hole cover assemblies, including particularly those of Bordes, and that can be inexpensively manufactured using conventional molding techniques.

Prior art designs cannot be manufactured from plastics without the improvements disclosed herein. The apparatus of the invention 1 includes modifications that allow the top plate 2, bottom plate 10, and ring gasket 8 to be manufactured of inexpensive plastic polymers. Additionally, the top plate 2, bottom plate 10, and ring gasket 8 are manufactured from thermal plastics which can easily be repaired, replaced or recycled should one or more of these parts fail during use. The plastics are preferably reinforced with glass. Preferred plastics include glass reinforced homopolypropylene, glass filed nylon, glass filed ethylene, and glass filled high impact styrene. Methods of formulating and molding such plastic polymers are well known to those of ordinary skill in the molding art. Another advantage of the use of polymers is that the top plate 2, the bottom plate 10, and the compression ring 8 can be easily reground and the reground material used to manufacture recycled replacement parts.

Prior art top plates are made of aluminum or other metals which do not match the color and texture of surface of the surrounding substrate. Prior art metallic top plates attract attention, particularly when used on surfaces or substrates other than cement, which results in unauthorized removal of prior art devices, leaving exposed inspection holes. The glass reinforced polymer top plate 2 of the invention 1 can be colored and textured to match or substantially match the surrounding bored substrate, thereby making the assembly less visible to vandals, and more compatible to the decor and colors of the surrounding substrate and environment. The ring gasket 8 and bottom plate 10 can also be colored to match the color of the top plate 2. Methods of coloring and texturing glass reinforced polymers are well known to those of ordinary skill in the art of molding. Appropriate coloring agents or colorants can be obtained from Accurate Color & Compounding of Aurora, Ill., including the following colorants: black no. 9102; tan no. 2911; grey no. 1031; and terra cotta no. 3138. In general, 1 to 5 percent colorant will be used per weight of polymer. Lower percentages of colorant result in lighter colored polymers, while higher percentages result in darker colors. Preferred colorants have a UV light inhibitor that prevents degradation of the color and the polymer that might otherwise result from long term exposure to sunlight. The foregoing methods result in color saturation of the top plate 2, which cannot be achieved with prior art metallic top plates. With color saturation, the top plate 2 retains its desired color even if the surface 3 of the top plate 2 is scratched, gouged, or otherwise damaged.

Additionally, metal top plates of the prior art are difficult or impossible to effectively paint and stain. In the apparatus of the invention 1, the top plate 2 can be made from polymer compositions that can be painted or stained. This embodiment is particularly useful in situations where the apparatus 1 will be used on a substrate that will be painted or stained, thus allowing the top plate 2 to be painted or stained to along with the substrate, resulting in an exact color match.

The prior art uses rubber compression rings. While rubber compression ring gaskets can be used with the invention 1, the compression ring 8 of the invention 1 is preferably molded from a non-rubber material, preferably a thermal plastic elastomer ("TPE"). TPE is less absorbent than rubber, and more chemically resistant to the effects of chemicals. As shown in FIGS. 3, 5, 6, and 7, the compression ring gasket 8 has an elongated sidewall and is preferably provided with internal vertical ribs 9. The internal vertical ribs 8 allow a thinner wall to be used on the gasket 8, which reduces the weight of the gasket 8 by up to 50 percent, thereby reducing the cost of manufacturing the ring gasket 8 without sacrificing the performance of the ring gasket 8 compared to currently manufactured rubber gaskets. The thin walled internally ribbed non-rubber thermal plastic elastomer ring gasket 8 is compressible along its longitudinal axis. When compressed, the ring gasket 8 expands circumferentially to engaged the sides of the walls of the receiving bored hole, as shown in FIG. 6.

Figure 1:
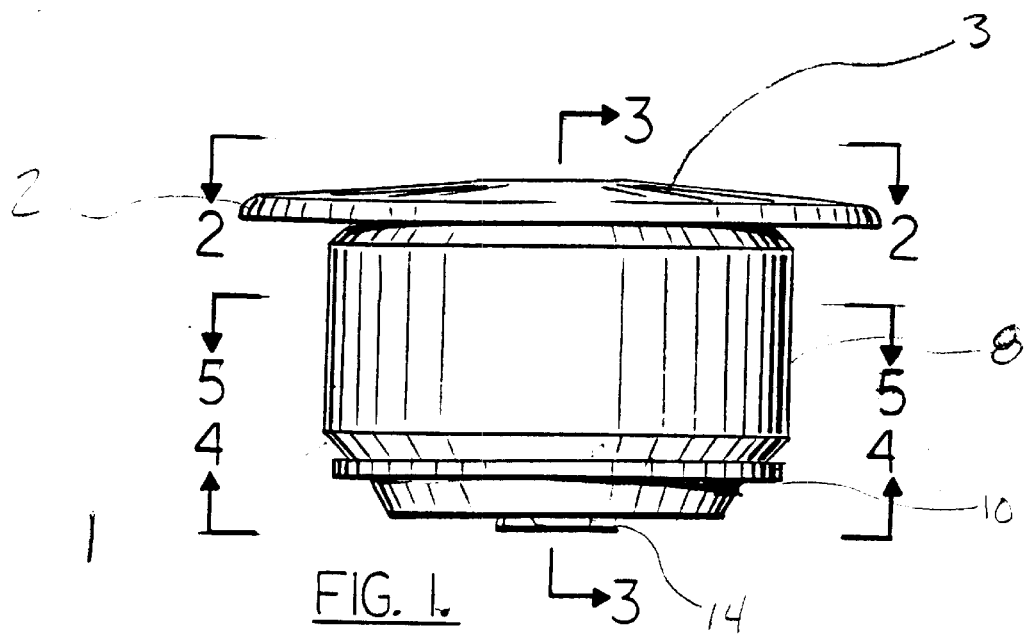
FIG. 1 shows a side view of the main body assembly of the tamper resistant non-corrosive bore hole assembly.
Figure 2:
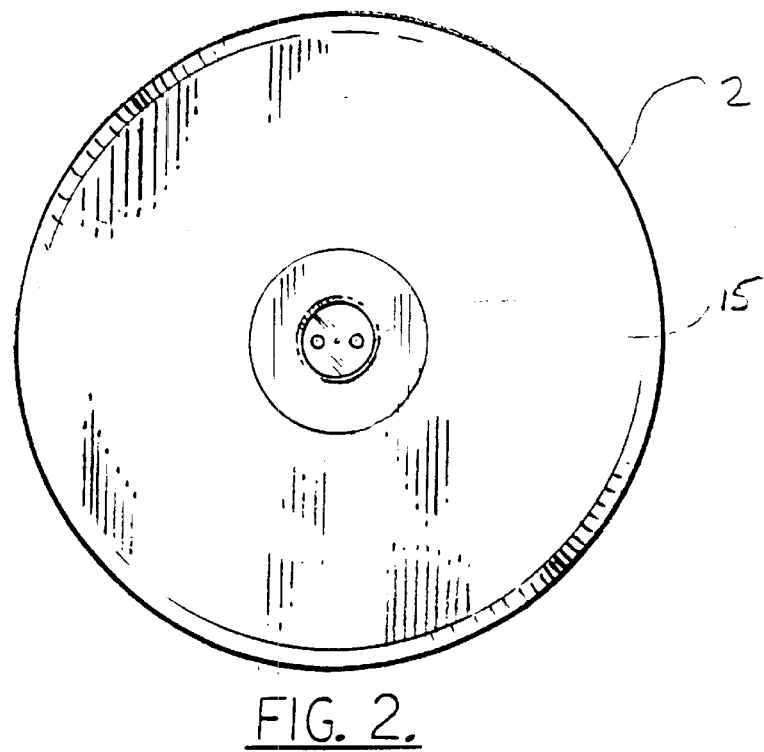
FIG. 2 shows a top view of the main body assembly of the tamper resistant non-corrosive bore hole assembly, taken along 2—2 of FIG. 1.

FIG. 1 shows a side view of the assembled tamper resistant non-corrosive bore hole cover assembly 1 and numerical designations of cross-section views of FIGS. 2,3,4 and 5. As shown in FIG. 1, the top surface 3 of the top plate 2 is preferably slightly convex. As shown in FIG. 2, the top plate 2 is preferably circular when viewed from above and is provided with a hole in the center 18. As shown in FIG. 3, the top plate hole 18 allows a theft resistant screw 15 to be installed through a non-rubber compression gasket 8 and connect to the bottom plate 10. FIG. 2 shows a top view of the top plate 2 with the theft resistant security bolt 15 slightly counter sunk below the surface of the top plate 2. The outer diameters of the gasket 8 and bottom plate 10 are preferably sized to substantially match the inner diameter of the bore hole, while the outer diameter of the top plate 2 is preferably larger than the diameters of the gasket 8, bottom plate 10, and bore hole. The top plate is conventionally 4 inches in diameter.

Prior art top and bottom plates are not engineered to resiliently return to their original shape if the top is depressed by heavy vehicles, equipment, materials, a hammer blow, etc. In the apparatus of the invention 1, the top plate 2 is convexed upward 3 to flatten when the top plate 2 is placed under tension by the tightening of the nut 14 and bolt 15, thus making the top plate 2 remain slightly curved upward to reduce water pooling.

To further enhance the strength and resiliency of the top plate 2, the top plate 2 is preferably provided with a plurality of reinforcement ribs 4 (See FIGS. 3 and 6). The reinforcement ribs are preferably radially disposed about the top plate opening 18 and are preferably formed on the bottom side of the top plate 2. The reinforcement ribs 4 reduce the deflection of the top plate 2 when put under tension during the tightening sequence, thus allowing the top plate 2 to remain curved or convex above the surface of the substrate, thereby reducing water pooling.

Prior art designs do not include a sufficient recess in the top plate to prevent the head of the bolt from protruding above the top surface of the top plate, where the bolt can snag toes and heels of passers-by. The prior art design of Bordes includes a recess, but due to the thin metal construction of the top plate of Bordes, the recess may not be sufficient to allow the head of the bolt to sit flush with the top plate. In the apparatus of the invention 1, the hole 18 receiving the metal bolt 15 on the top plate 2 is preferably slightly recessed into the top surface 3 to make the head of the metal bolt 15 sit substantially flush with or slightly recessed within the top surface 3 of the top plate 2. The recess is preferably sized and configured to match the size and configuration of the head of the bolt 15. The flush configuration of bolt 15 and top plate 2 reduces water pooling, and also prevents the head of bolt 15 from snagging toes and heels of passers-by.

When the Bordes prior art device is placed under tension in order to compress the gasket against a substrate, the gasket may "creep" along the bottom surface of the top plate and/or the top surface of the bottom plate, preventing uniform compression of the gasket against the substrate. Creep occurs because the bottom surface of the top plate of the Bordes prior art device is flat, and is not provided with a locating ridge or textured surface. Additionally, the bottom plate of Bordes is provided with a shallow upward indentation with tapered sides, which may not be sufficient to prevent creep when under high tension, and is also untextured. The apparatus of the invention 1 overcomes these failings of the prior art by providing a raised locating ridge 6, 13 on the bottom surface of the top plate 2 and the top surface of the bottom plate 10 respectively. The gasket locating ridges 6, 13 are of substantially equal outer diameter. The compressible ring gasket 8 has an inner diameter sized to tightly encircle the outer diameters of said gasket locating ridges 15 6,13.

Figure 7:
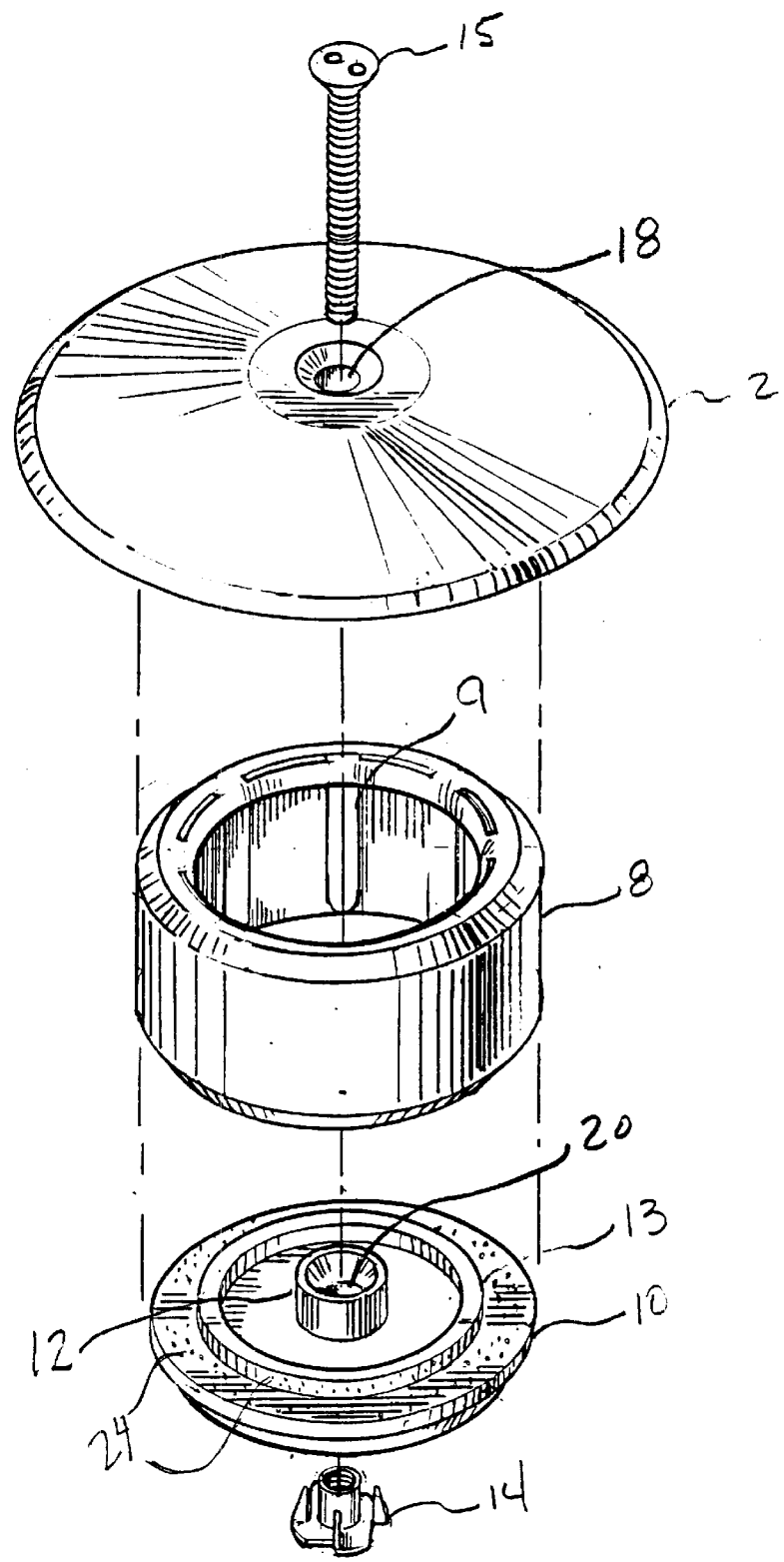
FIG. 7 shows an exploded view of the parts of the tamper resistant non-corrosive bore hole assembly.

The bottom surface of the top plate 2, the top surface of the bottom plate 10, and/or the outer diameter of the gasket locating ridges 6, 13 are also preferably textured or roughened 24, as shown in representational form in FIG. 7. The texture helps the compression ring gasket 8 grip the surfaces of the top 2 and the bottom 10 plates and/or the gasket locating ridges 6, 13 to thereby assist in maintaining the gasket 8 in proper position and avoid gasket creep. The texturing also assists in assembly of the ring gasket 8 on the top 2 and bottom 10 plates. In a preferred embodiment, the surface texture 24 is not particularly pronounced, and is difficult to detect with the naked eye or by touch. A roughened texture can be achieved by sandblasting the surface of the mold (rather than polishing the surface of the mold, which would achieve a smooth surface), in a mannerwell known to those of ordinary skill in the molding arts.

Figure 4:
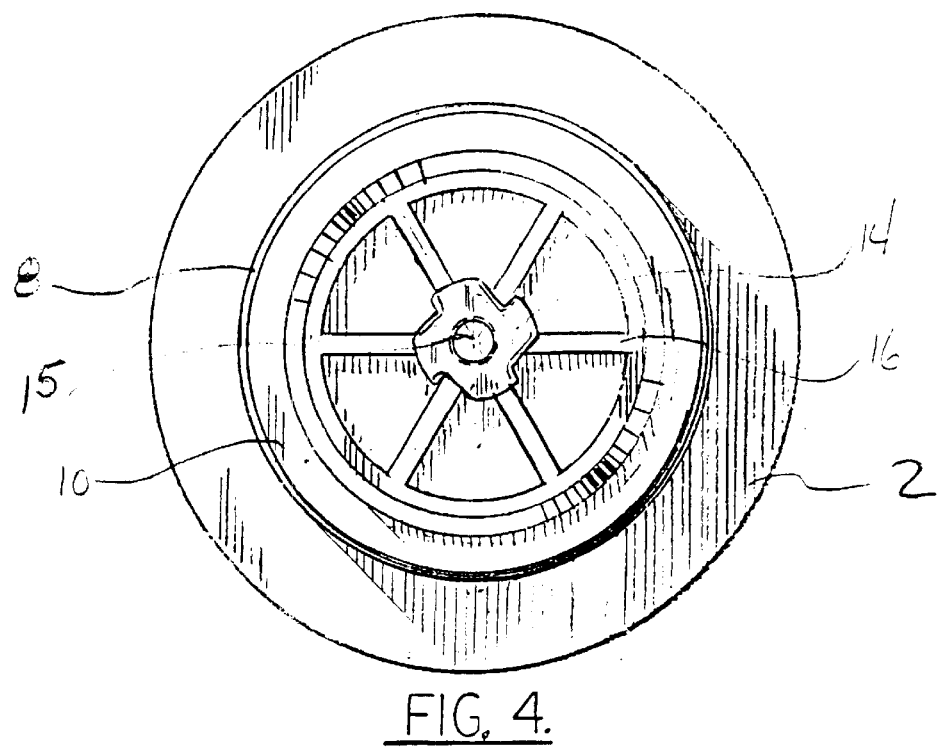
FIG. 4 shows a bottom view of the main body of the tamper resistant non-corrosive bore hole assembly, taken along 4—4 of FIG. 1.
Figure 3A:
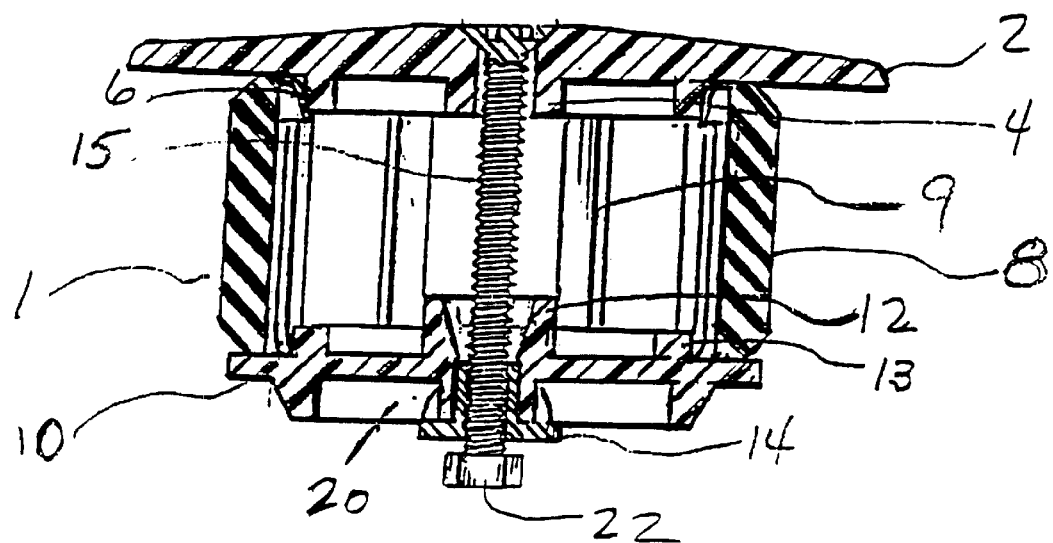
FIG. 3A shows a section view of the main body assembly as in FIG. 3, further illustrating a retainer means on the tail end of the bolt for retaining the lower plate on the apparatus during removal of the apparatus from a bore hole.

As shown in FIG. 1, the bottom plate 10 is preferably of a smaller diameter than the top plate 2. As shown in FIG. 4, the bottom plate 10 is preferably provided with a plurality of structural reinforcement ribs 16 that stiffen the plate 10 and reduce the deflection of the plates 10 when put under tension by tightening of the bolt 15. The ribs 16 are preferably radially disposed about the bottom plate opening 20. The ribs 16 are preferably formed on the bottom side of the bottom plate 10, as shown in FIG. 4. The ribs may also be formed on the top side of the bottom plate 10, or on both the top and bottom sides of the bottom plate 10. The reinforcement ribs 16 may also serve as stops to restrain the winged T-nut 14 from turning inside the central hole 20 in the bottom plate 10, as described in further detail below.

The hole 20 in the bottom plate 10 is threaded to match the external threads of the bolt 15. The threads may be formed in or molded into the polymer that comprises the bottom plate 10. In a preferred embodiment shown in FIGS. 3–7, the threads of bottom plate hole 20 are provided by a non-corrosive threaded winged t-nut 14 that is molded into or press fitted into the center hole 20 from the under side or bottom of the bottom plate 10.

As mentioned above, prior art designs are assembled using modified commonly vailable "plumber's plug" tops and/or base plates made of metal. In Bordes prior art esign, the base plate is threaded by welding a nut to the base plate. When placed under tension, the bottom plate of Bordes may bend, while the threads of the nut may strip. Once either of these failures occur, both the bottom plate and the nut become useless and cannot be effectively repaired or reused. The apparatus of the invention 1 solves this shortcoming of the prior art through use of the threaded t-nut 14. The t-nut 14 can be removed from the bottom plate 10, thus allowing a failed bottom plate 10 ort-nut 14 to be repaired in the field or recycled easily. As shown most clearly in FIG. 7, the t-nut 14 preferably has a plurality of wings 14A that depend downward from the collar portion 14B of the t-nut 14. As shown in FIGS. 3–4, the wings 14A can be positioned against the reinforcement ribs 16 of the bottom plate 10, such that the wings 14A assist in preventing rotation of the t-nut 14 relative to the bottom plate 10 and reduce stripping of the threaded t-nut 14 away from the bottom plate 10 should over torquing occur during field installation or use. The winged t-nut 8 is preferably made of stainless steel.

Another problem that occurs with prior art designs is dropping of the bottom plate into the bore hole during removal of the plug from vertical bore holes. When the bolt of the prior art is backed out of the nut in order to reduce compression against the bore hole, the bolt is sometimes inadvertently backed entirely out of the nut. When this occurs, the bottom plate falls into the bore hole, where it may be difficult or impossible to retrieve. This problem can be avoided by adding a retainer means such as retainer nut 22 to the tail end of the bolt 15 such that the retainer nut 22 prevents the bolt 15 from exiting the hole 20 in the bottom plate 10. The retainer nut 22 is preferably a blind retainer nut. The retainer nut 22 is preferably secured to the tail end of the bolt 15 by using a locking nut or by applying a locking solvent, such as Locktight 242, to the threaded bore of the retainer nut prior to threading the retainer nut on the bolt 15. The retainer nut 22 is preferably removably retained on the bolt 15, such that if the assembly 1 fails and must be disassembled for repair, the retainer nut 22 can be backed off of the bolt 15 by applying sufficient torque to break the bonds formed between the retaining nut 22 and the bolt 15.

A bolt locating ring or ridge 12 is preferably formed on the top side of the bottom plate 10 around the bottom plate aperture 20. The bolt locating ridge 12 assists in placing the tail end of the threaded metal security bolt 15 into the bottom plate aperture 20 during assembly of the top plate 2 and gasket 8 on the bottom plate 10. The ridge 12 is preferably tapered to assist in locating the aperture 20.

The security bolt 15 is manufactured from stainless steel or other non-corrosive materials. The bolt 15 preferably has a non-standard driving head such as a square head, star head, hexagon head, or spanner head in order to make it difficult for vandals to remove the apparatus 1 from the bore hole.

The hole covers of the prior art use components composed of different types of metals. When these dissimilar metal parts touch one another over extended periods of time, galvanic reactions occur that result in corrosion. For example, the present manufacturing design of Bordes uses an aluminum bottom plate, a stainless steel nut spot welded to the bottom plate, and a stainless steel bolt, which react with one another to corrode the weld and the aluminum. The apparatus of the invention 1 eliminates corrosion by using non-metallic components, by not allowing dissimilar metals from touching one another, and preferably by using similar metals (e.g. by using only stainless steel bolts 15 and nuts 14).

FIG. 3 shows a cutaway section view of the assembly of the tamper resistant noncorrosive bore hole cover assembly 1 wherein the top plate internal reinforcement ribs 4 and top plate compression gasket locating ridge 6 are cut away. The compression gasket internal ribs 9 are shown on the inside wall of the compression gasket 8. The bottom plate 10 shows the internal bolt locating ring 12, the bottom plate gasket locating ridge 13, and the non-corrosive winged t-nut 14 molded or press fitted into the bottom plate's center hole. The t-nut 14 is secured from twisting in place by the external reinforcement ribs 16 of the bottom plate 10.

Figure 5:
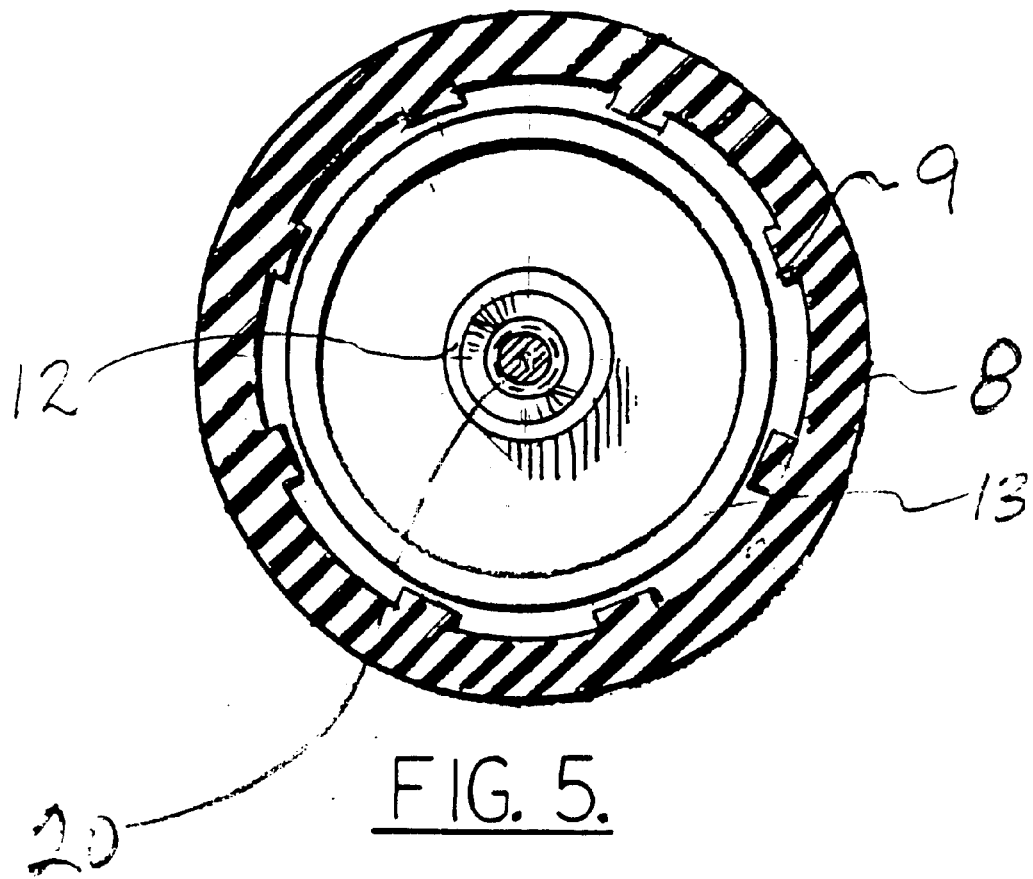
FIG. 5 shows a top view of the inside of the assembly from the top cap looking down of the Tamper resistant non-corrosive bore hole assembly, taken along 5—5 of FIG. 1.
Figure 6:
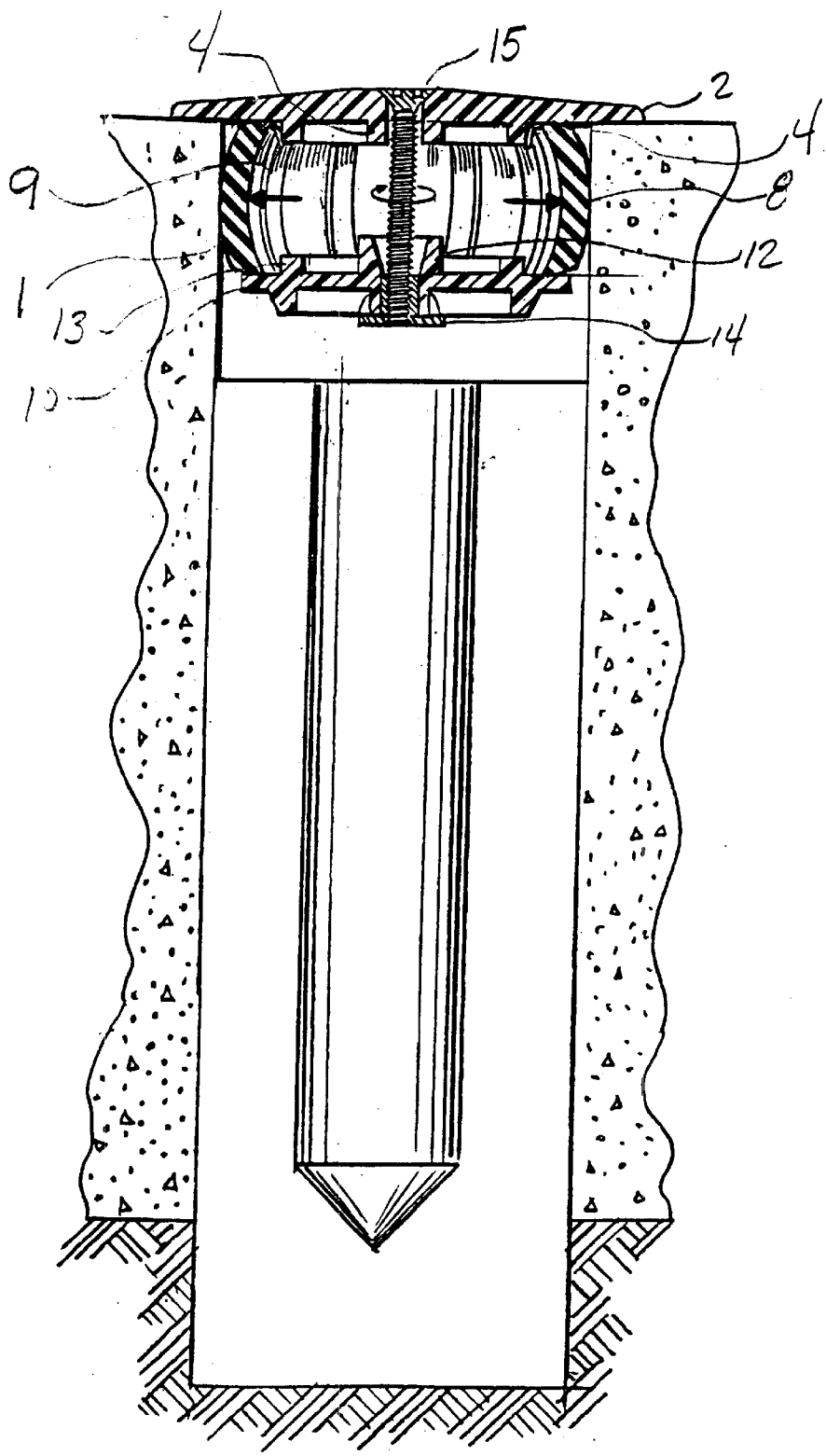
FIG. 6 shows a side view of the tamper resistant non-corrosive bore hole assembly installed over an insect bait station, illustrating compression of the ring gasket against the wall of the bore hole.

FIG. 5 shows a top internal view of the tamper resistant non-corrosive bore hole A o cover assembly wherein the ring gasket's internal ribs 9 are located on the top and bottom plates and the ring gasket 8 is held stationary by the gasket locating ridges 6, 13 of the top plate 2 and bottom plate 10. The bottom plate's bolt locating ring 12 is fabricated to assist the individual who is installing the security bolt 15 by making the threads 14 in the base plate easier to locate and start the security bolt 15 into.

FIG. 6 shows an installed cutaway side view of the tamper resistant non-corrosive bore hole cover assembly I wherein the top plate 2 with internal reinforcement ribs 4 is affixed to the ring gasket 8 and the bottom plate 10. The ring gasket 8 is shown being compressively pressed against the sides of the surrounding substrate as the theft resistant security bolt 15 is tightened into the t-nut 14.

FIG. 7 shows a perspective exploded view of the separate parts of the tamper resistant non-corrosive bore hole cover assembly 1. During assembly, the theft resistant security bolt 15 is inserted through the center hole 18 in the top plate 2, through the hollow internally ribbed 9 compression ring gasket 8, and into the bottom plate 10. The locating ring 12 is used to assist in locating the bottom plate hole 20. The non-corrosive threaded wing t-nut 14 is molded or press fitted into the center hole 20, preferably from the underside of the bottom plate 10.

In operation, the apparatus of the invention 1 is used by inserting the apparatus in the opening of the bore hole such that the top plate 2 rests against a surface of the substrate, and then rotating the bolt 15 to thereby circumferentially compress the compressible ring gasket 8 against the bore hole and thereby seal the bore hole. A termite bait material may be inserted in the bore hole prior to closing the bore hole with the bore hole cover 1. The color of the bore hole cover 1 may be selected such that the color of the bore hole cover 1 substantially matches a color of the surface of the substrate. When the threads of the threaded hole 14 have become worn or unuseable through overuse or over torquing, the threads can be replaced by removing the apparatus 1 from the bore hole, removing the bottom plate 10 from the apparatus, removing the t-nut 14 from the bottom plate hole 20, and inserting a new t-nut 14 in the bottom plate hole 20. The apparatus of the invention can be used for plugging and sealing virtually any type of hole formed in a substrate, including, for example, waterline repairs and inspection ports.

Listing of Parts of the Invention

The parts of the tamper resistant non-corrosive bore hole cover assembly shown in FIGS. 1 to 7 are:

1 complete assembly
2 glass reinforced polymer top plate
3 convex shape of top plate
4 top plate internal reinforcement ribs
6 top plate compression gasket locating ridge
8 non-rubber compression ring gasket
9 ring gasket's internal ribs
10 glass reinforced polymer bottom plate
12 bottom plate bolt locating ridge
13 bottom plate gasket locating ridge
14 non-corrosive threaded winged t-nut
14A wings of t-nut
14B collar of t-nut
15 non-corrosive theft resistant security bolt
16 bottom plate external reinforcement retaining ribs
18 center hole in top plate
20 center hole in bottom plate
22 retainer means
24 texturing Although the present invention has been described in terms of specific embodiments, it is anticipated that alterations and modifications thereof will no doubt become apparent to those skilled in the art. It is therefore intended that the following claims be interpreted as covering all alterations and modifications that fall within the true spirit and scope of the invention.

What is claimed is:

1. A non-corrosive bore hole cover apparatus for plugging a hole bored in a substrate comprising:

a top plate molded from a non-metallic material, said top plate having a hole therethrough, a bottom side of said top plate having an annular gasket locating ridge formed thereon;

a bottom plate molded from a non-metallic material, said bottom plate having a threaded hole therein, a top side of said bottom plate having an annular gasket locating ridge formed thereon;

said gasket locating ridges being of substantially equal outer diameter;

a compressible ring gasket having an elongated wall, said compressible ring gasket having an inner diameter sized to tightly encircle said outer diameter of said gasket locating ridges, said compressible ring gasket sandwiched between said top plate and said bottom plate such that said gasket locating ridges are inserted in either end of said compressible ring gasket; and a threaded bolt passing through said top plate hole such that a head of said bolt is retained against a top side of said tcp plate, a lower end of said bolt threaded through said hole of said bottom plate, whereby said bolt may be selectively rotated into said threaded hole to draw said top and bottom plate toward one another to thereby compress and circumferentially expand said ring gasket, said gasket locating ridges maintaining alignment of said compressible ring gasket and said top and bottom plates during compression to thereby achieve substantially uniform compression against said bore hole, further comprising said bottom side of said top plate having a plurality of reinforcement rib members formed thereon, said reinforcement rib members radiating outward about said top plate hole, said rib members providing reinforcement for said top plate, said top plate compression gasket locating ridge surrounding said plurality of reinforcing ribs which join said gasket locating ridge, whereby said reinforcing ribs and said gasket locating ridge extend substantially the same distance from the bottom of said top plate.

2. The apparatus of claim 1, wherein said top and bottom plates are molded from a glass reinforced polymer.

3. The apparatus of claim 1, wherein said top side of said top plate has a convex configuration so as to compensate for downward deflection of said top plate during compression of said compressible gasket ring and to reduce pooling of water on said top plate.

4. The apparatus of claim 1, wherein a top surface of said top plate is recessed about said top plate hole such that a head of said bolt is substantially flush with said top surface of said top plate to thereby reduce water pooling on said top plate.

5. The apparatus of claim 1, wherein said top plate is of a color selected to substantially match a color of a surface of the substrate.

6. The apparatus of claim 1, further comprising said compressible ring gasket having a plurality of ribs formed on an inner side of said elongated wall, said gasket ribs positioned longitudinally about said inner side of said elongated wall to thereby reinforce said ring gasket during compression, said gasket ribs permitting said compressible ring gasket to be of thin-walled construction and of reduced weight.

7. The apparatus of claim 1, wherein said compressible ring gasket is molded from a non-rubber thermal plastic elastomer.

8. The apparatus of claim 1, further comprising said top side of said bottom plate having a tapered bolt locating ridge formed about said threaded hole.

9. The apparatus of claim 1, further comprising said bottom plate having a plurality of rib members formed thereon, said bottom plate rib members radiating outward about said threaded hole, said bottom plate rib members providing reinforcement for said bottom plate.

10. The apparatus of claim 1, further comprising a bottom side of said bottom plate having a plurality of rib members formed thereon, said bottom plate rib members radiating outward about said threaded hole, said bottom plate rib members providing reinforcement for said bottom plate.

11. The apparatus of claim 10, wherein said threads of said bottom plate hole are provided by a non-corrosive threaded winged t-nut disposed in said hole, said wings of said t-nut configured and positioned to engage said bottom plate rib members so as to assist in maintaining said t-nut in fixed non-rotational relation to said bottom plate.

12. The apparatus of claim 1, wherein all said claimed components of said apparatus are constructed from materials that can be re-ground and recycled to manufacture duplicate replacement parts.

13. The apparatus of claim 1, further comprising a retaining means secured to a tail end of said threaded bolt, said retaining means preventing said bottom plate from separating from said apparatus during removal of said apparatus from said bore hole.

14. The apparatus of claim 1, further comprising a bottom surface of said top plate and a top surface of said bottom plate being textured, said texturing assisting said compression ring gasket in gripping said surfaces of said top and said bottom to thereby assist in maintaining the gasket in proper position and avoid gasket creep.

15. The apparatus of claim 1, wherein said threads of said bottom plate hole are provided by a non-corrosive threaded winged t-nut disposed in said hole.

16. The apparatus of claim 15, further comprising a bottom side of said bottom plate having a plurality of rib members formed thereon, said bottom plate rib members radiating outward about said threaded hole, said bottom plate rib members providing reinforcement for said bottom plate, and wherein said wings of said t-nut are configured and positioned to engage said bottom plate rib members so as to assist in maintaining said t-nut in fixed non-rotational relation to said bottom plate.

17. The apparatus of claim 16, wherein said top plate is of a color selected to substantially match a color of a surface of the substrate.

18. The apparatus of claim 17, wherein said top side of said top plate has a convex configuration so as to compensate for downward deflection of said top plate during compression of said compressible gasket ring and to reduce pooling of water on said top plate.

19. The apparatus of claim 18, further comprising said compressible ring gasket having a plurality of ribs formed on an inner side of said elongated wall, said gasket ribs positioned longitudinally about said inner side of said elongated wall to thereby reinforce said ring gasket during compression, said gasket ribs permitting said compressible ring gasket to be of thin-walled construction and of reduced weight.

20. The apparatus of claim 19, further comprising said top side of said bottom plate having a tapered bolt locating ridge formed about said threaded hole.

21. The apparatus of claim 5, wherein said bottom plate and said ring gasket are of a color selected to substantially match said color of said surface of the substrate.

22. A method of selectively closing an opening of a hole bored in a substrate comprising:

(a) providing a bore hole cover apparatus, said bore hole cover apparatus comprising, a top plate molded from a non-metallic material, said top plate having a hole therethrough, a bottom side of said top plate having an annular gasket locating ridge formed thereon;

a bottom plate molded from a non-metallic material, said bottom plate having a threaded h ole therein, a top side of said bottom plate having an annular gasket locating ridge formed thereon;

said gasket locating ridges being of substantially equal outer diameter;

a compressible ring gasket having an elongated wall, said compressible ring gasket having an inner diameter sized to tightly encircle said outer diameter of said gasket locating ridges, said compressible ring gasket sandwiched between said top plate and said bottom plate such that said gasket locating ridges are inserted in either end of said compressible ring gasket; and a threaded bolt passing through said top plate hole such that a head of said bolt is retained against a top side of said top plate, a lower end of said bolt threaded through said hole of said bottom plate, whereby said bolt may be selectively rotated into said threaded hole to draw said top and bottom plate toward one another to thereby compress and circumferentially expand said ring gasket, said gasket locating ridges maintaining alignment of said compressible ring gasket and said top and bottom plates during compression to thereby achieve substantially uniform compression against said bore hole, further comprising said bottom side of said top plate having a plurality of reinforcement rib members formed thereon, said reinforcement rib members radiating outward about said top plate hole, said rib members providing reinforcement for said top plate, said top plate compression gasket locating ridge surrounding said plurality of reinforcing ribs which join said gasket locating ridge, whereby said reinforcing ribs and said gasket locating ridge extend substantially the same distance from the bottom of said top plate;

(b) inserting said bore hole cover apparatus in said opening of said bore hole such that said top plate rests against a surface of said substrate; and (c) rotating said bolt to thereby circumferentially compress said compressible ring gasket against said bore hole and thereby seal said bore hole.

23. The method of claim 22, further comprising the step of inserting a termite bait material in said bore hole prior to closing said bore hole with said bore hole cover apparatus.

24. The method of claim 22, further comprising the step of selecting a color of said top plate such that said color of said top plate substantially matches a color of said surface of said substrate.

25. The method of claim 22, further comprising the steps of, when said threads of said threaded hole have become worn or unuseable through overuse or over torquing, removing said bore hole cover apparatus from said bore hole, removing said bottom plate from said apparatus, removing said t-nut from said bottom plate hole, and inserting a new t-nut in said bottom plate hole.

* * * * *